United States Patent
Bruno

(10) Patent No.: US 8,903,237 B2
(45) Date of Patent: Dec. 2, 2014

(54) METHOD AND APPARATUS FOR DETERMINING A SIGNAL TRANSFER CHARACTERISTIC ALONG A LIGHT PATH IN AN OPTICAL NETWORK

(75) Inventor: Gianmarco Bruno, Genoa (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 491 days.

(21) Appl. No.: 13/126,058

(22) PCT Filed: Oct. 27, 2008

(86) PCT No.: PCT/EP2008/064534
§ 371 (c)(1),
(2), (4) Date: Jul. 11, 2011

(87) PCT Pub. No.: WO2010/048982
PCT Pub. Date: May 6, 2010

(65) Prior Publication Data
US 2011/0255861 A1    Oct. 20, 2011

(51) Int. Cl.
*H04B 10/08* (2006.01)
*H04L 12/26* (2006.01)
*G01M 11/00* (2006.01)
*H04B 10/077* (2013.01)

(52) U.S. Cl.
CPC ............ *H04L 43/50* (2013.01); *H04L 12/2697* (2013.01); *G01M 11/335* (2013.01); *H04B 10/0775* (2013.01)
USPC .................................. 398/16; 398/25; 398/27

(58) Field of Classification Search
USPC .............................................. 398/25–28, 16
See application file for complete search history.

(56) References Cited

U.S. PATENT DOCUMENTS

| 4,156,183 A | * | 5/1979 | Schuon ........................ 324/76.17 |
| 5,227,623 A | * | 7/1993 | Heffner .......................... 250/225 |
| 5,663,822 A | * | 9/1997 | Fee ................................... 398/95 |

(Continued)

FOREIGN PATENT DOCUMENTS

| DE | 195 20 165 A1 | 11/1995 |
| EP | 0 905 490 A1 | 3/1999 |

(Continued)

OTHER PUBLICATIONS

Chinese Office Action, dated Dec. 27, 2012, in connection with counterpart Chinese Application No. 200880132606.3 (see translation below).

(Continued)

*Primary Examiner* — Dzung Tran
(74) *Attorney, Agent, or Firm* — Leffler Intellectual Property Law, PLLC

(57) ABSTRACT

There is provided a method for determining a signal transfer characteristic along a light path between a first point and a second point in an optical network. The optical network comprises at least one optical element situated in the light path. The method comprises transmitting a plurality of optical test signals of different bandwidths from the first point along the light path. Each signal has a known bandwidth and a known power. The method further comprises receiving the optical test signals at the second point after they have travelled along the light path and measuring the power of each received optical test signal. The method also comprises determining the signal transfer characteristic along the light path from the power measurements.

20 Claims, 6 Drawing Sheets

(56) References Cited

U.S. PATENT DOCUMENTS

| | | | |
|---|---|---|---|
| 5,825,530 | A | 10/1998 | Leckel et al. |
| 6,389,068 | B1* | 5/2002 | Smith et al. ............... 375/225 |
| 6,538,778 | B1 | 3/2003 | Leckel et al. |
| 6,714,699 | B1 | 3/2004 | Cao et al. |
| 7,149,407 | B1 | 12/2006 | Doerr et al. |
| 7,471,710 | B2* | 12/2008 | Cliche et al. ............ 372/38.08 |
| 2002/0015201 | A1* | 2/2002 | Zhou et al. ................ 359/124 |
| 2003/0118263 | A1* | 6/2003 | Phua et al. .................... 385/11 |
| 2004/0071381 | A1 | 4/2004 | Szafraniec et al. |
| 2004/0165888 | A1* | 8/2004 | Gerstel et al. ............... 398/45 |

FOREIGN PATENT DOCUMENTS

| | | |
|---|---|---|
| EP | 1 705 811 A1 | 9/2006 |
| JP | 62 268221 A | 11/1987 |
| WO | 2007/143621 A | 12/2007 |

OTHER PUBLICATIONS

Translation of Chinese Office Action, dated Dec. 27, 2012, in connection with counterpart Chinese Application No. 200880132606.3.

PCT International Search Report, mailed Jul. 23, 2009, in connection with International Application No. PCT/EP2008/064534.

Stanic, S. et al. "On monitoring transparent optical networks" International Conference on Parallel Processing Workshops, Proceedings, 2002. Aug. 18-21, 2002, Piscataway, NJ, USA, IEEE, Aug. 18, 2002, pp. 217-223, XP010608451, ISBN: 978-0-7695-1680-6.

* cited by examiner

METHOD AND APPARATUS FOR DETERMINING A SIGNAL TRANSFER CHARACTERISTIC ALONG A LIGHT PATH IN AN OPTICAL NETWORK

TECHNICAL FIELD

This invention relates to a method and apparatus for determining a signal transfer characteristic along a light path in an optical network.

BACKGROUND

A typical optical network is made up of optical filter elements such as multiplexers, demultiplexers, interleavers, deinterleavers, wavelength selective switches or any other element that has filtering characteristics. As an optical signal passes through the optical network, it crosses various filter elements. When crossing an optical filter element, the optical signal is likely to deteriorate as it is processed. For example, the bandwidth of the optical signal may change due to the filter element through which it passes, or the optical power of the signal may change due to passing through a filter element.

The transfer function of a filter element provides a measure of the amount of deterioration of an optical signal as it passes through that filter element. For example as a signal passes through a limited bandwidth channel of a filter element, the signal may lose part of its optical power due to the limited bandwidth of the channel. In order to account for such power loss, manufacturers of the optical filters provide specifications which are relied upon by system designers when designing the optical network.

SUMMARY

According to an aspect of the invention, there is provided a method for determining a signal transfer characteristic along a light path between a first point and a second point in an optical network. The optical network comprises at least one optical element situated in the light path. The method comprises transmitting a plurality of optical test signals of different bandwidths from the first point along the light path. Each signal has a known bandwidth and a known power. The method comprises receiving the optical test signals at the second point after they have travelled along the light path and measuring the power of each received optical test signal. The method also comprises determining the signal transfer characteristic along the light path from the power measurements.

Advantageously an accurate and reliable determination of the transfer characteristic along a light path is possible using this method. It is thus possible to more efficiently use the light path to carry light signals. It is not necessary to rely upon conservative transfer function estimates provided by equipment manufacturers.

Optionally, the step of transmitting the plurality of optical test signals comprises transmitting some or all of the optical test signals at the same power.

Optionally, measuring the power of each received optical test signal comprises measuring only the power of each received optical test signal, and measuring no other properties.

Optionally the step of transmitting the plurality of optical test signals comprises transmitting a plurality of optical test signals of increasing bandwidth. A first optical test signal may be transmitted of a first bandwidth, then a second optical test signal may be transmitted of a second, greater bandwidth. Each optical test signal subsequently transmitted may be of a greater bandwidth than the preceding optical test signal.

The step of transmitting the plurality of optical test signals may comprise initially transmitting a narrowband optical test signal.

Optionally the step of transmitting the plurality of optical test signals comprises transmitting signals at the same bandwidth at different known polarisations. The method may comprise depolarising the received optical test signals into a plurality of beams prior to measuring the power of each beam and determining the signal transfer characteristic of each beam.

The method may further comprise generating the plurality of optical test signals. Optionally the step of generating the plurality of optical test signals comprises generating optical white noise, filtering the noise to provide the required bandwidth for the optical test signal and attenuating the noise to provide a required power for the optical test signal. Optionally the step of generating the optical test signals comprises generating optical test signals of the same bandwidth at different polarisations.

The method may comprise transmitting no optical test signal along the light path and measuring the power of any received signal to determine the light path noise level and using the determined light path noise level when determining the signal transfer characteristic along the light path.

According to another aspect the invention provides a method of making or updating an optical network comprising one or more optical elements. The method comprises measuring signal transfer characteristics along a light path according to any one or more of the above method steps and making or updating the network based on the determined signal transfer characteristic.

Making or updating the network may comprise selecting an optical modulation technique to be used in the network based upon the determined signal transfer characteristic.

According to another aspect there is provided an optical network comprising a light path extending between a first point and a second point. At least one optical element is provided in the light path. The optical network comprises a testing mechanism for determining a signal transfer characteristic along the light path. The testing mechanism comprises a transmitter arranged to transmit a plurality of optical test signals of different bandwidths from the first point along the optical path. Each optical test signal has a known bandwidth and a known power. The network includes a receiver arranged to receive the optical test signals at the second point after they have travelled along the light path and a measurement device arranged to measure the power of each received optical test signal. The network also includes a processor arranged to determine the signal transfer characteristic along the light path from the power measurements.

Advantageously the optical network may then be controlled in dependence upon the determined characteristic. The network may thus function efficiently taking into account real measured transfer functions instead of conservative estimates provided by equipment manufacturers. There is likely to be less wasted bandwidth in such a network.

Optionally the receiver comprises a broadband photodiode and the measurement device comprises a power meter.

The network may comprise a spare transponder at the second point and the transponder comprises the receiver and the measurement device.

Optionally the optical network comprises a generator arranged to generate the plurality of optical test signals. The generator may comprise a white noise generator arranged to generate optical white noise, an optical filter arranged to filter the noise to provide the required bandwidth for the optical test signal and an optical attenuator arranged to attenuate the noise to provide a required power for the optical test signal.

The generator may comprise a polariser arranged to polarise the optical test signal to provide a known polarisation. The optical network may comprise a polarisation beam splitter arranged to depolarise the optical test signal prior to measurement.

Optionally the or each optical element comprises any one or more or a combination of an optical multiplexer, an optical demultiplexer, an optical interleaver, an optical deinterleaver, an optical wavelength selective switch or similar optical element.

According to another aspect of the invention there is provided a test element for an optical network for determining a signal transfer characteristic along a light path between a first point and a second point in the optical network. At least one optical element is located in the light path. The test element comprises a transmitter interface mechanism arranged to interface with the first point in the network. The test element comprises a transmitter arranged to transmit a plurality of optical test signals of different bandwidths from the first point along the optical path. The test element also comprises a controller arranged to control the bandwidths of the optical test signals.

Advantageously, the test element can be used with a new or existing optical network for improving efficiency of the network by providing a measured determination of transfer characteristics.

The test element may comprise a test card.

According to another aspect the invention provides a test device for an optical network for determining a signal transfer characteristic along a light path between a first point and a second point in the optical network. At least one optical element is located in the light path. The test device comprises a receiver interface mechanism arranged to interface with the second point in the network. The test device comprises a receiver arranged to receive a plurality of optical test signals after they have travelled along the light path.

Advantageously, the test device can be used with a new or existing optical network for improving efficiency of the network by providing a measured determination of transfer characteristics.

The test device may comprise a measurement device arranged to communicate with the receiver and measure the power of each received optical test signal.

The test device may comprise a processor arranged to determine the signal transfer characteristic along the light path from the power measurements.

DETAILED DESCRIPTION

The present inventor has appreciated that the prior art filter element specifications typically provide worse case scenarios for available bandwidth values associated with a signal passing through a typical filter element. Since worse case scenario transfer functions are provided, they assume an excessively high deterioration value or power loss value of an optical signal. This can lead to the functions specifying available bandwidth which is less than that which is actually available for a particular filter element. In turn, this can lead to the network designer providing an over-engineered and over-complicated solution when designing the optical network as they try to compensate for falsely, highly calculated signal deterioration. The present inventor has thus appreciated that the designer will typically be trying to fit signals into a tighter bandwidth unnecessarily by using more complex modulation techniques than necessary, or otherwise not getting the best, most efficient use out of the available filter elements.

Figure 1:
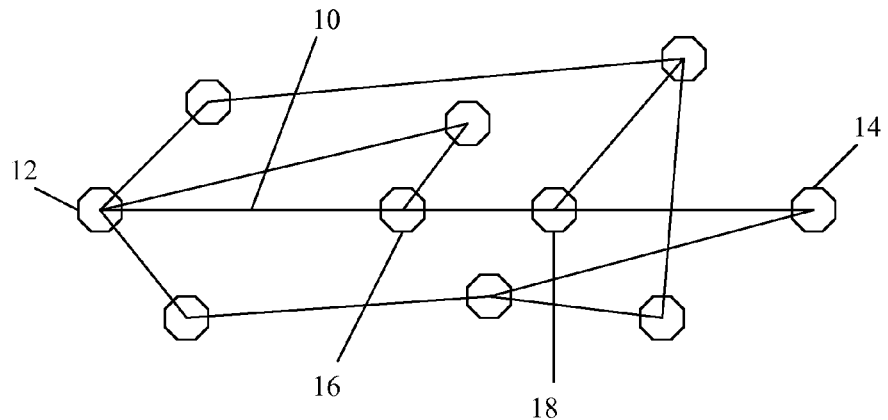
FIG. 1 shows an optical network according to an embodiment of the invention.
Figure 2:
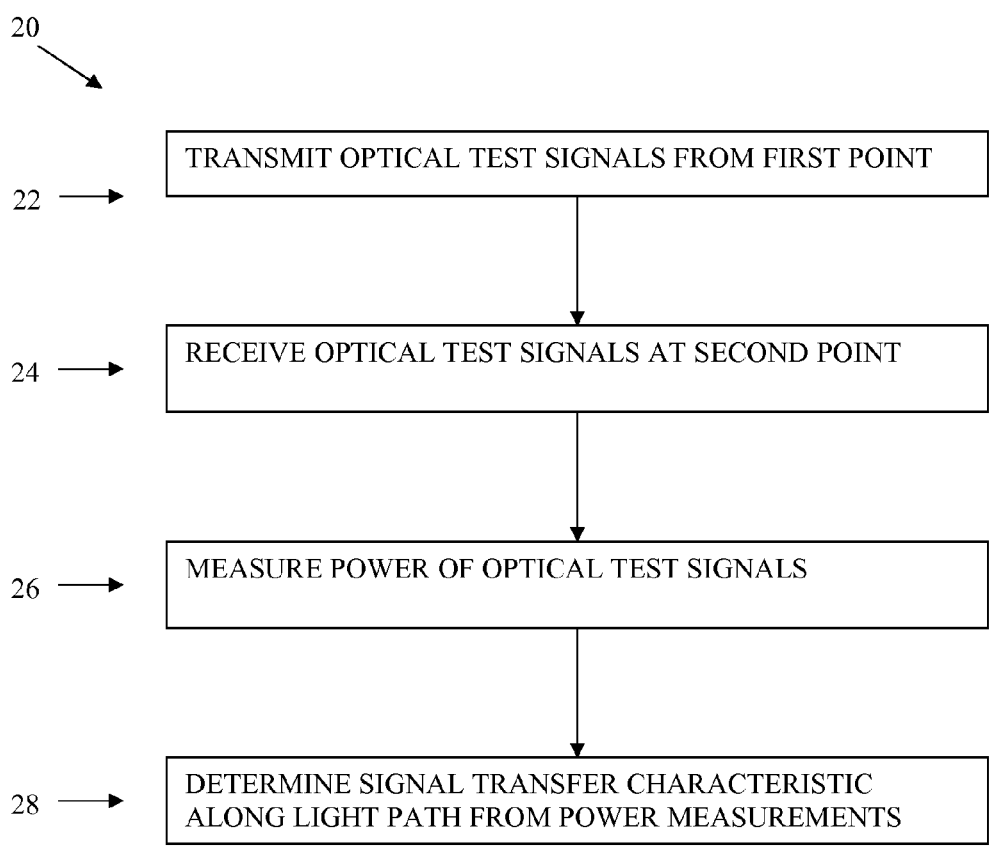
FIG. 2 is a flowchart outlining a method according to an embodiment of the invention.

Referring to FIGS. 1 and 2, there is shown a schematic representation of a light path 10 in an optical network having a plurality of points. The light path 10 extends between a first point 12 and a second point 14 and optical signals are able to pass between the first and second points 12, 14 along the light path 10. In this example, each point represents an optical element and two optical elements 16, 18 are situated in the light path 10. In other embodiments, only one optical element may be situated in the light path, or in yet further embodiments more optical elements may be situated in the light path.

As described previously, when an optical signal travels along the light path 10, it will be affected by the optical transfer functions of the first and second optical elements. In this embodiment, the optical elements are chosen from the group of an optical multiplexer, an optical demultiplexer, an optical interleaver, an deinterleaver, or an optical wavelength selective switch. In other embodiments an optical element may be any other similar, or suitable, optical element whose effect upon an optical signal passing along a light path is desired to be measured.

Referring to FIG. 2, according to an embodiment of the present invention there is provided a method 20 for determining a signal transfer characteristic along the light path 10. The method 20 can be used for determining a signal transfer characteristic along any similar light path between a first point and a second point in an optical network comprising at least one optical element which is situated in the light path.

The method 20 comprises transmitting 22 a plurality of optical test signals of different bandwidths from the first point 12 along the light path 10. Each transmitted signal has a known bandwidth and a known power (e.g. a predetermined bandwidth and a predetermined power). The method 20 further comprises receiving 24 the optical test signals at the second point 14 after they have travelled along the light path 10. Since the signals have travelled along the light path, they will have been affected by the transfer functions of any optical elements along the light path (in this example, the first optical element 16 and the second optical element 18) and so will contain information regarding their transfer functions e.g. their filtering characteristics.

The method 20 comprises measuring 26 the power of each received optical test signal and determining 28 the signal transfer characteristic (also known as the transfer function) along the light path 10 from the power measurements made at step 26 of the method 20. Accordingly, the information regarding the transfer function along the light path 10 which is present in the optical signals is determined through measuring the power of the optical test signals.

Figure 3:
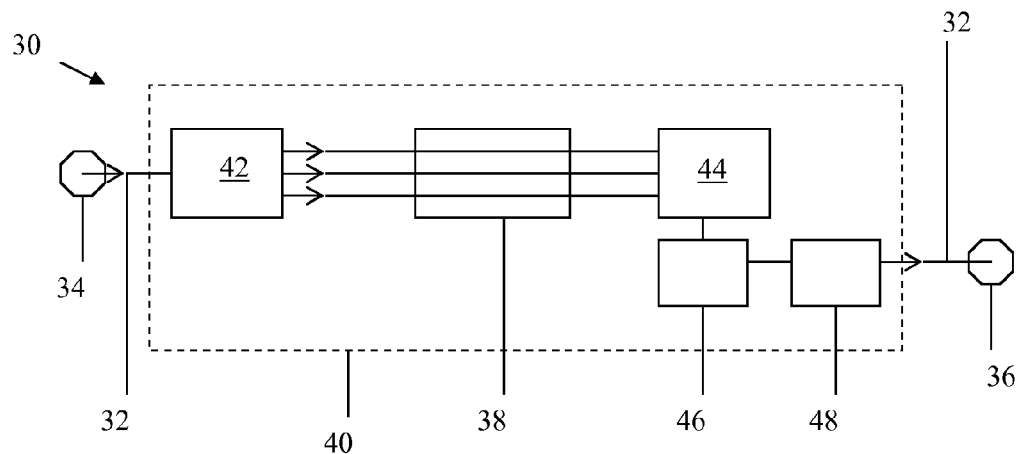
FIG. 3 schematically shows a system for measuring transfer characteristics in a light path according to an embodiment of the invention.

In one embodiment, referring to FIG. 3 an optical network 30 comprises a light path 32 extending between a first point 34 and a second point 36. An optical element arrangement 38 comprising a plurality of optical elements is provided in the light path 32. In other embodiments, the optical element arrangement 38 may comprise only one optical element. The optical network 30 comprises a testing mechanism 40 for determining a signal transfer characteristic along the light path 32. It is desired to know the signal transfer characteristic experienced by optical signals between the first point 34 and the second point 36 and so it is desired to know the optical transfer characteristics of the optical element arrangement 38 as a whole, rather than the individual optical transfer characteristics of the individual elements of the optical element arrangement 38. It is not necessary to know each of the individual optical transfer characteristics of the optical elements making up the optical element arrangement 38 in order to determine the overall optical transfer characteristic of the arrangement 38 using the present method. Therefore accurate and efficient determination of the optical transfer characteristic is provided.

The testing mechanism 40 comprises a transmitter 42 arranged to transmit a plurality of optical test signals of different bandwidths from the first point 34 along the optical path 32. Each optical test signal has a known bandwidth and a known power. The testing mechanism 40 also comprises a receiver 44 arranged to receive the optical test signals at the second point 36 after they have travelled along the light path 32. The testing mechanism 40 also includes a measurement device 46 in communication with the receiver 44 and arranged to measure the power of each received optical test signal. The testing mechanism 40 also includes a processor 48 in communication with the measurement device 46 and arranged to determine the signal transfer characteristic along the light path 32 from the power measurements made by the measurement device 46.

In some embodiments, the optical network comprises a 40 Gb/s or 100 Gb/s optical network. In other embodiments the optical network might comprise even higher speed networks. In such high speed networks, the advantages of using bandwidth efficiently are particularly important.

Figure 4:
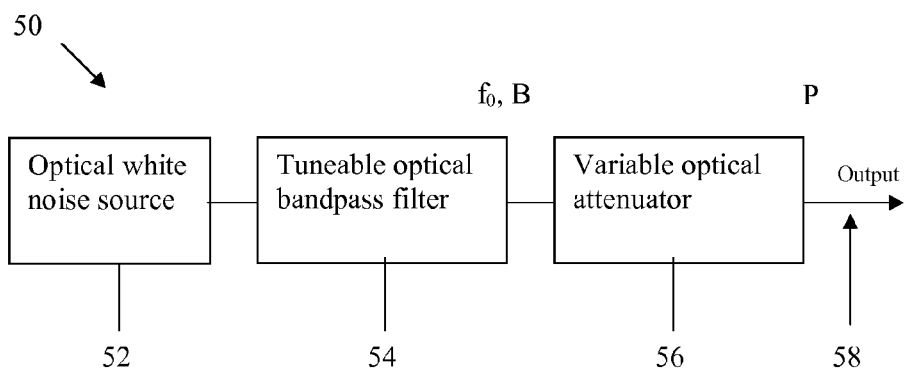
FIG. 4 schematically shows an optical signal generator used with an embodiment of the invention.

Referring to FIG. 4, in some embodiments, an optical network comprises a generator 50 arranged to generate the plurality of optical test signals. The generator 50 comprises an optical white noise source 52 in communication with a tuneable optical bandpass filter 54, which is in turn in communication with a variable optical attenuator 56. The optical white noise source 52 is arranged to provide a noise signal having a substantially flat spectral output over a transmission bandwidth range of interest. For example, this may be over the C-band (about 1460 nm to 1530 nm) and the L-band (about 1565 nm to 1625 nm). The optical white noise source should have enough power (for example from an external power source) to provide the required amount of noise signal in all necessary measurement conditions.

The tuneable filter 54 is operable to select the required portion of the noise signal from the source 52. There are two aspects to the tuneability requirements of the filter 54. Firstly, tuneability is required in both the central wavelength of the output signal 58, and also the channel bandwidth of the output signal 58. The output signal 58 is then transmitted as previously described as one of the optical test signals which have a known power and a known bandwidth.

The optical attenuator 56 is used to keep the overall output signal 58 at the required power level. For example, in some embodiments, the power of all output signals 58 is kept constant.

In some embodiments, the central frequency of the different output signals 58 is varied, and this is taken into account when estimating transfer functions along a light path (discussed in further detail below). In other embodiments, the central frequency of the different output signals 58 is kept constant, and this allows a simpler processing of the estimation of the transfer function in a light path.

In some embodiments, the receiver 44 comprises a photodiode (not shown) arranged to receive a plurality of optical test signals after they have travelled along the light path. The photodiode comprises a broadband photodiode which is capable of measuring the optical power of a received test signal with an acceptable error throughout all of the working optical bandwidth. The working optical bandwidth is the bandwidth across which the traffic signals which pass through the optical network, and the filters and other optical network elements are operational when the network is being used. For example the C-band or the L-band optical bandwidth. Other suitable possible bandwidth ranges will be apparent to the skilled person. The acceptable error is defined by a network designer according to network requirements.

Advantageously the receiver architecture can be made very simple and is easy to implement. Accompanying the receiver, the optical network of some embodiments also provides a measurement device which is arranged to measure the power of each received optical test signal, and this may comprise a power meter in some embodiments.

In some embodiments, the optical network comprises a spare transponder at the second point (which defines the light path) and the spare transponder comprises the receiver and the measurement device. Therefore there is no need for any new apparatus to be installed within the network at the second point.

A spare transponder is a transponder which is already present in the optical network but is not currently being used for network traffic transmission. It may be a transponder which is working and physically connected to the second point so it is able to detect incident optical signals. It is quite typical in some networks to have such spare transponders, for example in ASON (automatically switched optical networks) networks—such transponders become active after some event like traffic rerouting, for example following a fault in the network, when more traffic than usual might be passing through the second point. A spare transponder may be present in an optical network to allow for failure of a primary transponder. Some transponders are equipped with a power splitter which splits off a small fraction (for example 5% or less) of an incoming signal in order to provide power measurements of the incoming signal. Usually, this power measurement is used to control a variable optical attenuator at the receiver which helps control operation of another receiver (for example in the form of a photodiode) which receives the 95% power of the incoming signal, in order to allow the receiver photodiode to work properly. If the power measurement is made and the power is too low, an alarm is triggered, and similarly if it is too high. In the embodiments where such a transponder is used, this power measurement can be used to measure the power of each received optical test signal and thus determine the signal transfer characteristic along the light path.

In other embodiments, a dedicated receiver is introduced into the optical network, and a spare transponder (or other form of existing network receiver) is not used. A receiver interface mechanism is provided in order to connect the receiver to the second point in the network. The receiver interface mechanism may be of a known form, for example of the type which connects a normal transponder to a point in an optical network.

Figure 5:
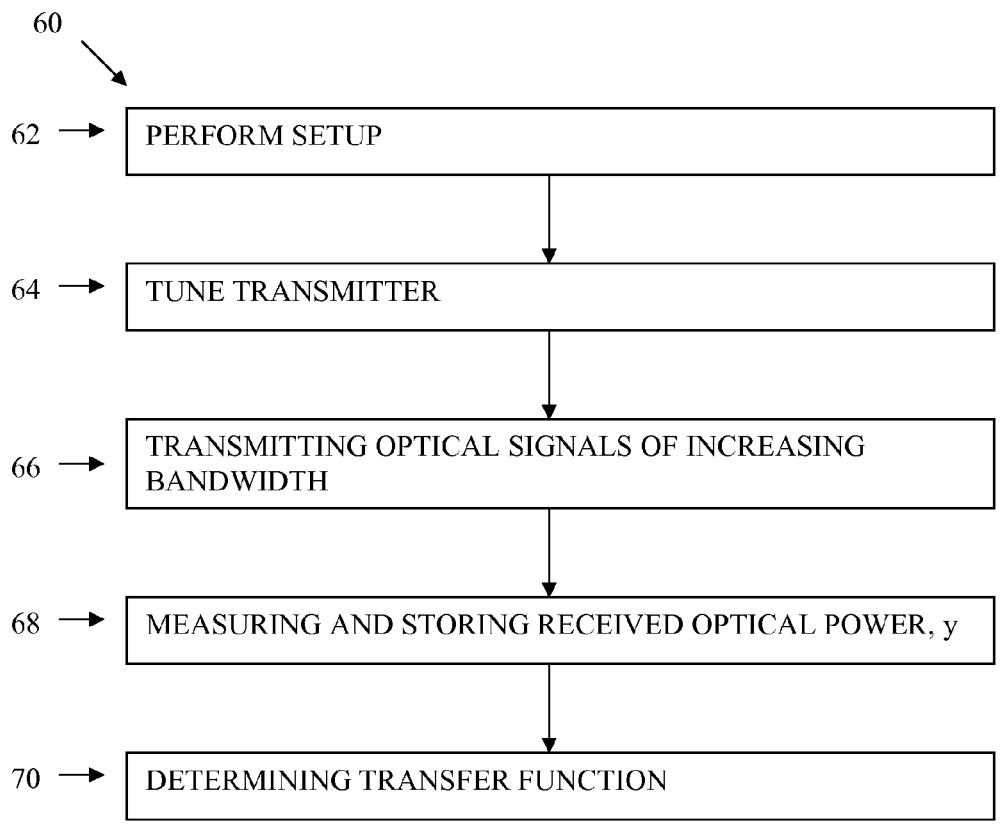
FIG. 5 is a flowchart outlining a method of determining transfer characteristics in a light path according to an embodiment of the invention.

Referring to FIG. 5, a method 60 according to one particular embodiment of the present invention is described in more detail. The method 60 uses the apparatus shown in FIGS. 3 and 4 and is arranged to determine signal transfer characteristic along the light path 32 between the first point 34 and the second point 36 in the optical network 30. The optical element arrangement 38 in this example comprises a number of sources of noise and signal attenuation as described in further detail below in relation to the algorithm used for determining the transfer function.

The method 60 comprises initially performing setup 62 of the light path 32 between the first point 34 and the second point 36 in the optical network. Performing setup 62 involves providing a central frequency, $f_0$, to the communication channel for which the transfer function is to be determined. In other embodiments, the setup step may not be part of the method—the relevant details relating to the communication channel may already be stable and set up. The optical elements making up the optical element arrangement 38 must be stable and this is ensured during the performing of the setup. For example, for optical elements such as a wavelength selective switch or a reconfigurable optical add-drop multiplexer, it may be necessary to wait until such elements reach a stable condition (e.g. a condition in which the transfer function does not significantly vary, and which is the condition that is intended to be present in normal use) before making any measurements. For example, if the optical elements have only recently been switched on then it may be necessary to wait for them to reach normal operating condition.

Once the channel centred at frequency $f_0$ is operational, the next step of the method 60 comprises tuning 64 the central wavelength of the transmitter 42 to $f_0$. In this embodiment, all of the optical test signals are transmitted at the same central frequency. In other embodiments, optical test signals may be transmitted at different central frequencies. Accordingly, in such embodiments, this setup is being performed prior to transmission of optical test signals, then different corresponding optical channels will need to be set up at the different central frequencies being used.

Figure 6:
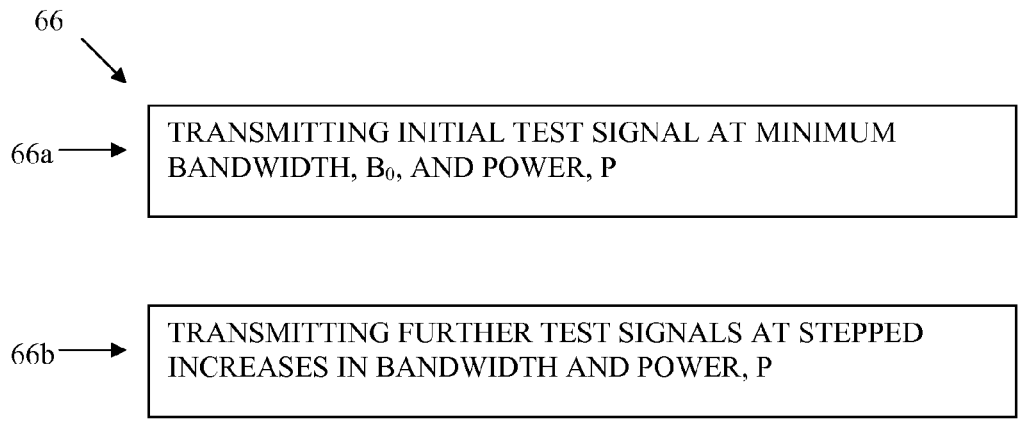
FIG. 6 is a flowchart outlining a method of transmitting signals of increasing bandwidth according to an embodiment of the invention.

Once the transmitter is tuned at step 64, the method comprises transmitting 66 optical test signals of increasing bandwidth. In this particular embodiment, referring to FIG. 6, step 66 comprises setting 66a the bandwidth of the optical test signal to a minimum possible bandwidth, $B_0$ and the power of the optical test signal to a desired value, P—this is done by adjusting the output of the variable optical attenuator 56. In this embodiment all of the optical test signals are transmitted with the same power. In other embodiments, some or all of the optical test signals may be transmitted at different powers. Processing of information used in determining the transfer function across the light path then becomes more complicated as described in further detail below.

The step 66 in this example, following step 66a, comprises transmitting 66b further test signals at stepped increases in bandwidth and with a power, P. The bandwidth step increase between adjacently transmitted signals (i.e. adjacent in time) is kept constant in this example. In other embodiments the bandwidth change may be a function of the bandwidth of the optical test signal.

The step 66 of transmitting optical signals of increasing bandwidth is performed until the bandwidth of the optical test signal reaches, or becomes close to, a maximum allowed value, $B_{max}$. $B_{max}$ is determined according to the allowed bandwidth of the optical channel being used.

Referring again to FIG. 5, the step 68 of measuring and storing received optical power values, $y_1, y_2, y_3 \ldots$ is performed for each transmitted optical test signal. In this embodiment, the minimum bandwidth, $B_0$, is set such that the initial optical test signal is a narrowband test signal (i.e. $B_0$ is a lot less than the bandwidth available in the optical channel being used). In general, for the purposes of this specification a narrowband signal can be considered to be a signal which occupies about $1/100^{th}$, or less, of the bandwidth of a channel.

For example, if the bandwidth of a channel is about 35 to 45 GHz (as would be the case in a 50 GHz—spaced system), a narrowband signal is a signal which would occupy about $1/100^{th}$, or less, of the channel bandwidth—i.e. in this example a lot less than 1 GHz.

A typical laser source used in commercial 10 Gbit/s or 40 Gbit/s transmitters has an unmodulated linewidth of 10 MHz—this can be used to generate narrowband signals for the purposes of this invention.

The method 60 then comprises determining 70 the signal transfer characteristic (or transfer function) along the light path 32 from the power measurements made at step 68. A more detailed explanation of the way in which the processor 48 determines the transfer function across the light path 32 is now provided with reference to FIG. 7 which helps illustrate a model, used in this embodiment, for estimating noise accumulation and optical element transfer function concatenation across the light path 32.

Figure 7:
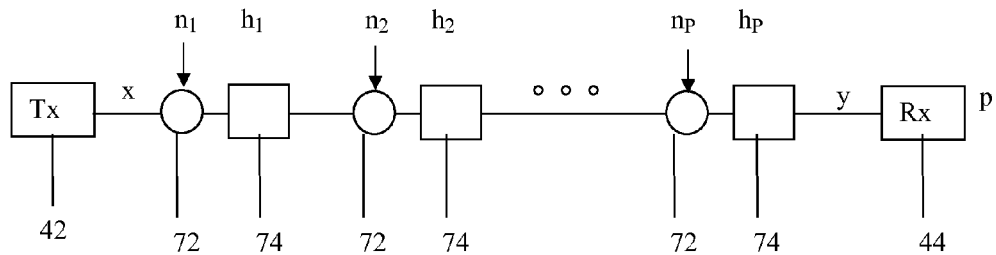
FIG. 7 schematically shows a system for creating a model for estimating transfer characteristics in a light path according to an embodiment of the invention.

In FIG. 7, the section of the light path from the transmitter 42 to the receiver 44 is shown and the optical element arrangement 38 is represented by a series of optical amplifiers 72 and optical elements 74. The optical amplifiers 72 add noise to any optical signal which travels through them and are present in the network in order to compensate for power loss as a signal travels through the network. This power loss may be due to the signal travelling through optical components previously during its passage through the network. The optical elements 74 have a significant filtering transfer function which affects the optical signals travelling through the network. For simplicity, in the present example, the spectral dependency of the attenuation experienced by an optical signal travelling through the transmission fibre itself (which joins the transmitter 42 and receiver 44) is assumed to be negligible. Also, the spectral dependency of the gain of any amplifier through which the signal passes is assumed to be negligible.

The received signal power, y, is a function of the transmitted signal and of all the other variables. The superscript is indicative of the position along the light path:

$$y^{(1)} = (x + n_1)h_1 \tag{1}$$

$$y^{(2)} = (y^{(1)} + n_2)h_2 = xh_1h_2 + n_1h_1h_2 + n_1h_2 \tag{2}$$

where x is the transmitted signal power, $h_j$ is the transfer function at the $j^{th}$ optical element and $n_j$ is the noise at the $j^{th}$ optical amplifier. Therefore:

$$y = y^{(P)} = x \prod_1^P h_j + n \qquad (3)$$

The term n contains all the remaining terms that do not depend on the input signal. It is the sum of the optical noises generated by the amplifiers that are subsequently filtered: it can be considered constant as long as the overall link configuration remains the same, i.e. the saturation levels of all amplifiers do not change.

At the step i of the process, an optical test signal is transmitted with bandwidth $B_i$ and the received measured power $p_i$ is calculated from $y_i$ as follows:

$$P_i = \int_\infty y_i(f) df = \int_\infty [h(f) x_i(f) + n(f)] df \qquad (4)$$

When the transmitter source is approximated as having an ideal rectangular spectrum of power $P_i$ and bandwidth $B_i$ we get:

$$x_i(f) = P_i \cdot \prod\left(\frac{f}{B_i}\right) \qquad (5)$$

where $$\prod\left(\frac{f}{B_i}\right) = \begin{cases} 1/B_i & |f| < \frac{-B_i}{2} \\ 0 & |f| > \frac{B_i}{2} \end{cases}$$

$P_i$ is the power of the transmitted test signal at the i-th step. All powers are in linear units (mW). The upper case represents the transmitted power and the lower case represents received power. The received power $p_i$ becomes:

$$p_i = \frac{P_i}{B_i} \int_{-B_i/2}^{B_i/2} h(f) df + c \cong \frac{2P_i}{B_i} \int_0^{B_i/2} h(f) df + c \qquad (6)$$

Where c is the term not dependent on the transmitted signal. In order to estimate h, the above equation (6) is applied to the measurement step i+1 and then the difference between the two power measurements is estimated:

$$p_{i+1} - p_i \cong 2\left[\frac{P_{i+1}}{B_{i+1}} \int_0^{B_{i+1}/2} h(f) df - \frac{P_i}{B_i} \int_0^{B_i/2} h(f) df\right] =$$

$$= 2\left[\frac{P_{i+1}}{B_{i+1}} \int_0^{B_{i+1}/2} h(f) df - \frac{P_{i+1}}{B_{i+1}} \int_0^{B_i/2} h(f) df - \frac{P_i}{B_i} \int_0^{B_i/2} h(f) df + \frac{P_{i+1}}{B_{i+1}} \int_0^{B_i/2} h(f) df\right] =$$

$$= 2\frac{P_{i+1}}{B_{i+1}} \left(\int_0^{B_{i+1}/2} h(f) df - \int_0^{B_i/2} h(f) df\right) -$$

$$2\left(\frac{P_i}{B_i} - \frac{P_{i+1}}{B_{i+1}}\right) \int_0^{B_i/2} h(f) df \cong$$

$$\cong \frac{P_{i+1}}{B_{i+1}} (B_{i+1} - B_i) \frac{h_i + h_{i+1}}{2} - \left(\frac{P_i}{B_i} - \frac{P_{i+1}}{B_{i+1}}\right) (p_i - c) \frac{B_i}{P_i} =$$

$$= P_{i+1} \delta_{i+1} \frac{h_i + h_{i+1}}{2} - \left(1 - \frac{P_{i+1}}{P_i} \frac{B_i}{B_{i+1}}\right) (p_i - c)$$

Equation (7) is rewritten to get $h_{i+1}$:

$$h_{i+1} = \frac{2}{P_{i+1} \delta_{i+1}} \left[(p_{i+1} - p_i) + \left(1 - \frac{P_{i+1}}{P_i} \frac{B_i}{B_{i+1}}\right)(p_i - c)\right] - h_i \qquad (8)$$

When Pi is constant ie Pi=P, to P, the above relation becomes:

$$h_{i+1} = \frac{2}{P \delta_{i+1}} \left[(p_{i+1} - p_i) + \left(1 - \frac{B_i}{B_{i+1}}\right)(p_i - c)\right] - h_i = \qquad (9)$$

$$= \frac{2}{P} \left[\frac{(p_{i+1} - p_i)}{\delta_{i+1}} + (p_i - c)\right] - h_i$$

It can be seen that the processing in embodiments where the transmitted power is constant is simpler than the processing where the transmitted power is not constant.

The above estimation for determining transfer function holds when i>0. When i=0 equations (8) and (9) (which deal with non-constant transmitted power and constant transmitted power respectively) reduce to estimating the overall loss/gain experienced by a very narrow bandwidth signal at the nominal centre frequency, $f_0$. It is necessary to provide this measurement using a narrow bandwidth test signal as an input to allow the processing to take place. This can be achieved by sending an initial narrowband optical test signal as previously described (or a signal at the lowest possible bandwidth), for example by using a tuneable laser source or by using a non-modulated laser carrier or a spare transponder located at the first point 34.

In equations (8) and (9), c is representative of the noise in the light path and is measured by transmitting no optical test signal along the light path and measuring the power of any signal detected at the receiver 44 in the absence of any transmitted signal in order to determine the light path noise level. This light path noise level is then used to determine c, and thus for determining the signal transfer characteristic along the light path.

Accordingly, there is provided a method for determining the signal transfer characteristic along the light path in which only the power of each received optical test signal needs to be measured. No other properties of the optical test signals need to be measured. Therefore a very simple and efficient mechanism for determining the signal transfer characteristic along the light path is provided.

In one particular experimental example, the inventor has simulated a 10 span amplified optical light path, i.e. with a system set up similar to that shown in FIG. 7, with 10 optical elements. Each of the first and second points between which the light path extends was equipped with a second order Gaussian filter with 60 GHz FWHM (full width half maximum)—this acts like a commercial available 100 GHz reconfigurable optical add-drop multiplexer. The total loss between amplifiers is 25 dB.

Figure 8:
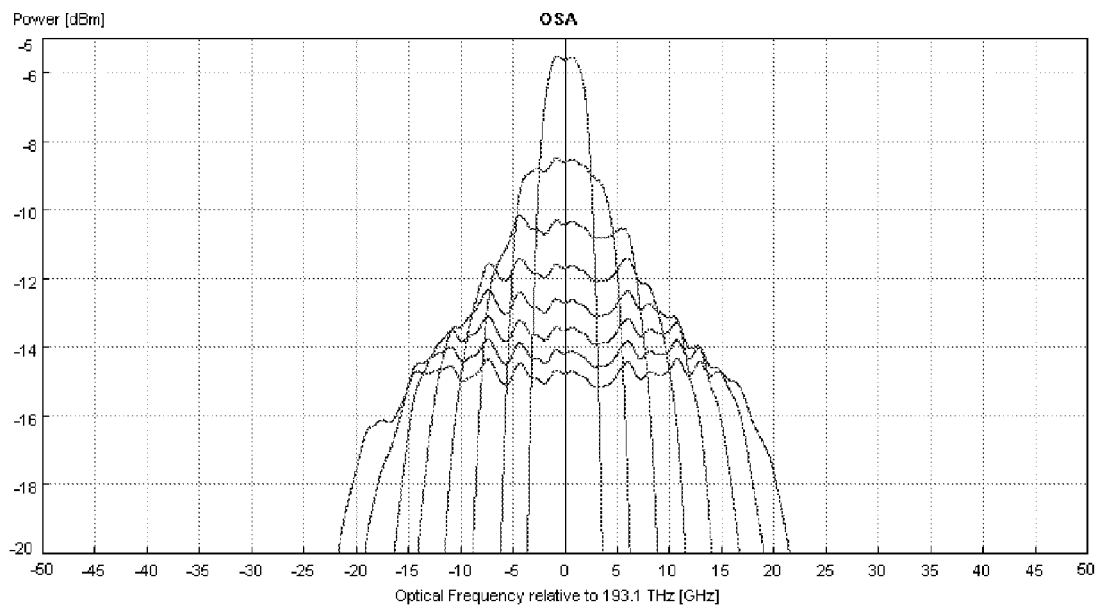
FIG. 8 is a graph showing properties of transmitted signals in an embodiment of the invention.

Referring to FIG. 8, there is shown a plot of the optical spectrum of each signal transmitted from the transmitter (with resolutions 0.01 nm). The irregularity of the transmitted signal plots is due to the finite length of the simulations. The total integrated power was constant, at 1 mW. The bandpass filter of the transmitter was set from 5 GHz to 100 GHz. Only the first eight optical test signal plots are shown in FIG. 8 (in order to keep the figure clear). Ideally, FIG. 8 should show eight $4^{th}$ order Gaussian shapes having the same area (representing the integrated power). The y-axis is in log units, so the plots do not initially appear to be of the same area, but they are. The optical test signals were transmitted in order of increasing bandwidth in increasing steps of 5 GHz between adjacent test signals.

Figure 9:
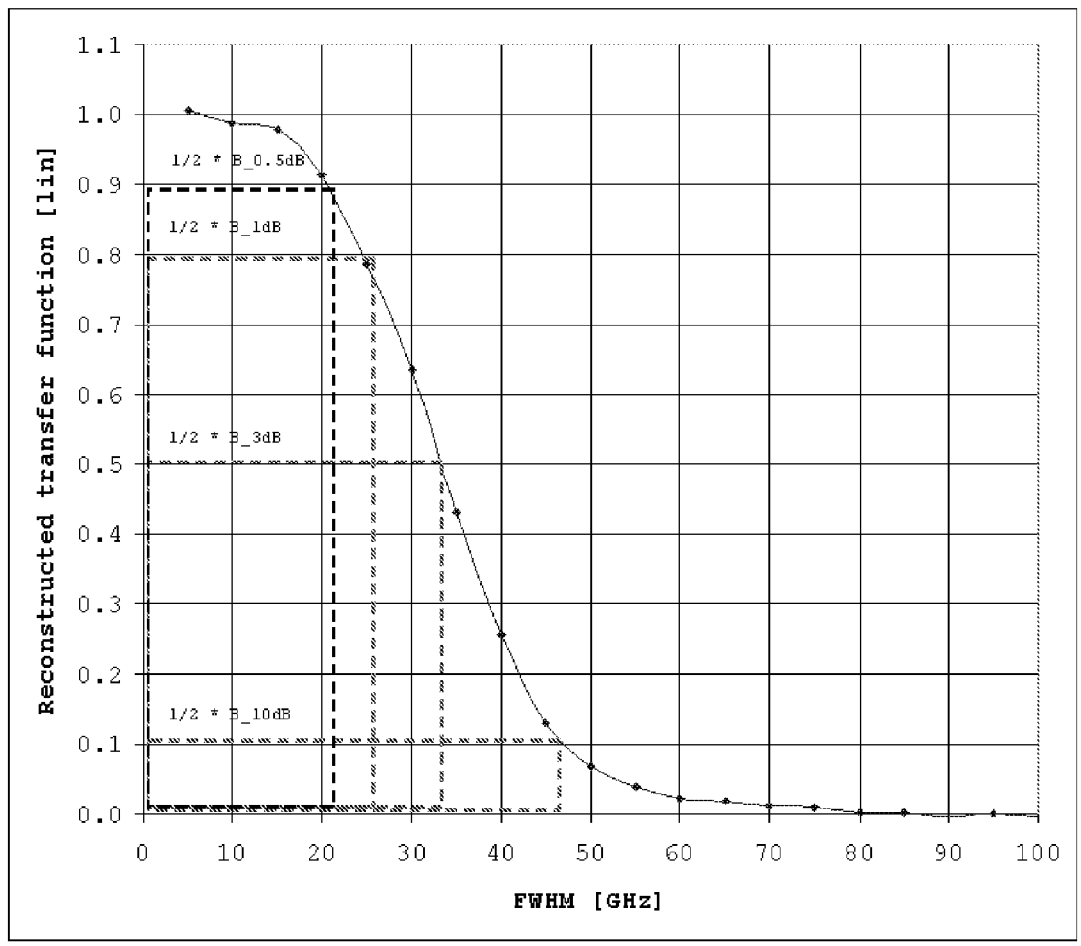
FIG. 9 is a graph showing properties of received signals in an embodiment of the invention.

Referring to FIG. 9, the output of the estimation method according to this example is shown. i ranges from 1 to 20 (each value of i represents one of the 20 optical test signals). On the y-axis, the transfer function, h at $\pm B_i/2$ is in linear units. For example, when i=9, $B_9$=45 GHz. $y_9$ is a corresponding received power and $h_9$ is the value of the transfer function at $\pm 22.5$ GHz. FIG. 9 shows that the transfer function is practically 1 (i.e. a narrowband test signal passes substantially unaffected through the light path), and the optical test signal power is halved at about 33 GHz which means that the transfer function, h is about 0.5 at $\pm 16.5$ GHz, before it substantially vanishes.

In some embodiments, the step of transmitting the plurality of optical test signals comprises transmitting the test signals at the same bandwidth, but with different known polarisations. In some such embodiments, the method also comprises depolarising the received optical test signals into a plurality of beams before measuring the power of each beam in order to determine the signal transfer characteristic of each beam. In such embodiments, the optical signal generator comprises a polariser arranged to polarise the optical test signals in order to provide the known polarisation, and the network also comprises a polarisation beam splitter arranged to depolarise the optical test signals before measurement. In such embodiments, the skilled person will appreciate that the possibility of using test signals, and subsequently actual traffic signals, of different polarisations along the light path can be investigated, with the clear benefit of increasing usable bandwidth along the light path.

The possibility of using a polarisation dependent measurement can be implemented by generating test signals of different known polarisations for each bandwidth. At the transmitter a polarisation filter may be provided, and no extra apparatus at the receiver. A plurality of signals, at least one for each polarisation axis, could be transmitted, and the worst or average result can be measured.

Alternatively, the transmitter remains the same, and at the receiver there is provided a polarisation beam splitter and a plurality of photodiodes (one per polarisation axis). This can be used to provide an indication of possible polarisation axes which are usable along the light path, or which are best along that particular light path.

Figure 10:
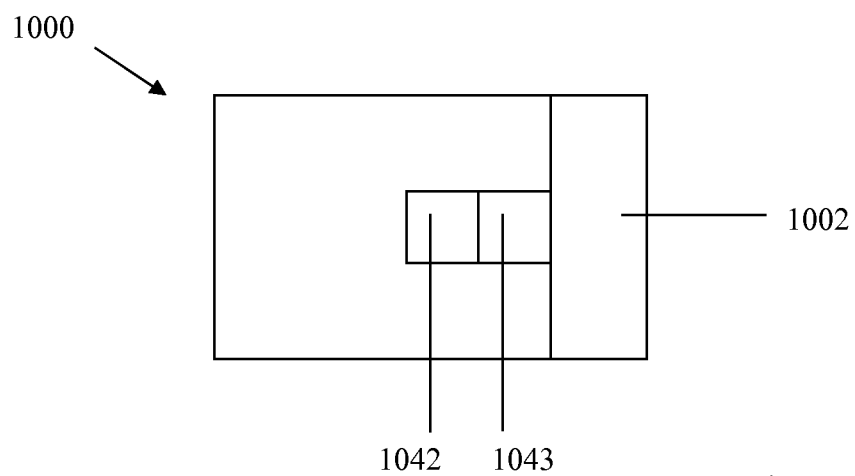
FIG. 10 schematically shows a test element according to an embodiment of the invention, for use with an optical network.

Referring to FIG. 10, in some embodiments there is provided a test element 1000 for an optical network (such as the network shown in FIG. 3) for determining the signal transfer characteristic along the light path 32. The test element comprises a transmitter interface mechanism 1002 arranged to interface with the first point in the network and also a transmitter 1042 which is arranged to transmit the plurality of optical test signals from the first point. The test element 1000 of this embodiment also includes a controller 1043 arranged to control the bandwidths of the optical test signals. In other embodiments, this control function may be provided by a remote controller. In one embodiment, this test element takes the form of a test card. The transmitter interface mechanism 1002 allows the test card to interact with the first point of the network in order to allow the present method to be performed from the first point in the network. The test card may be interfaceable with a node in an existing optical network such that a more accurate assessment of the transfer function through light paths in the existing optical network can be carried out.

Figure 11:
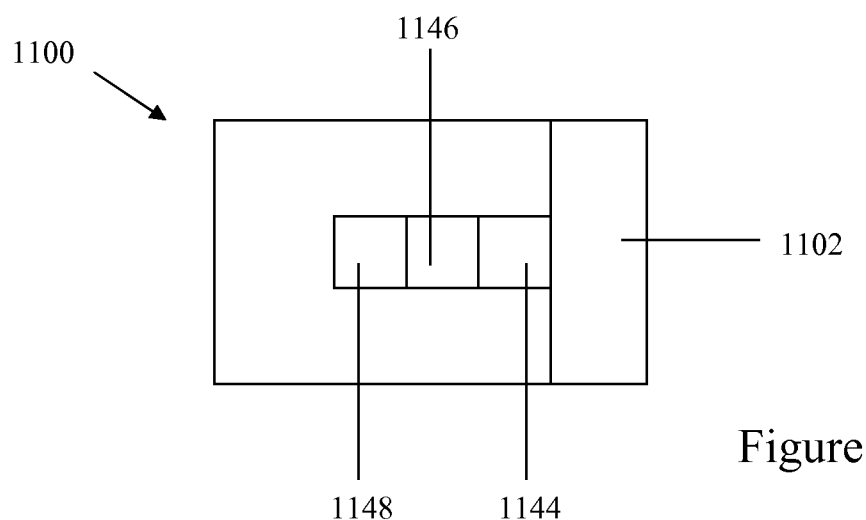
FIG. 11 schematically shows a test device according to an embodiment of the invention, for use with an optical network.

Referring to FIG. 11, in some embodiments there is provided a test device 1100 for an optical network (such as the network shown in FIG. 3) for determining the signal transfer characteristic along the light path 32. The test device 1100 comprises a receiver interface mechanism 1102 arranged to interface with the second point 36 in the network. The test device 1100 comprises a receiver 1144 arranged to receive a plurality of optical test signals after they have travelled along the light path. In this embodiment, the test device 1100 comprises a measurement device 1146 arranged to communicate with the receiver 1144 and measure the power of each received optical test signal. In other embodiments the measurement mechanism may be provided separately from the device 1100. Also, in this embodiment, the test device 1100 comprises a processor 1148 arranged to determine the signal transfer characteristic along the light path from the power measurements. Again, in other embodiments the processing mechanism may be provided separately from the device 1100.

One aspect of this invention provides a method of making or updating an optical network which includes using the method as previously described and making or updating the network based upon the determined signal transfer characteristic. In this way previously inaccurate transfer function data can be updated or added in order to make a network design more efficient. Making or updating the network might comprise selecting an optical modulation technique to be used in the network based upon the determined signal transfer characteristic. For example, it may be determined that a less costly, or less complicated modulation technique can be implemented in a network when previously it was not thought possible due to relying upon manufactures transfer function specifications. For example it may be determined that binary phase shift keying can be used instead of quadrature phase shift keying.

Various modifications may be made to the present invention without departing from its scope.

The invention claimed is:

1. A method for determining a signal transfer characteristic along a light path between a first point and a second point in an optical network comprising at least one optical element situated in the light path, the method comprising:
    transmitting a plurality of optical test signals of different bandwidths from the first point along the light path, each signal having a substantially rectangular spectrum of power, a known bandwidth and a known power;
    receiving the optical test signals at the second point after they have travelled along the light path;
    measuring the power of each received optical test signal; and
    determining the signal transfer characteristic along the light path from the power measurements and the known bandwidths.

2. The method of claim 1, in which the step of transmitting the plurality of optical test signals comprises transmitting some or all of the optical test signals at the same power.

3. The method of claim 1, in which measuring the power of each received optical test signal comprises measuring only the power of each received optical test signal, and measuring no other properties.

4. The method of claim 1, wherein the step of transmitting the plurality of optical test signals comprises transmitting a plurality of optical test signals of increasing bandwidth.

5. The method of claim 4, wherein the step of transmitting the plurality of optical test signals comprises initially transmitting a narrowband optical test signal.

6. The method of claim 1, wherein the step of transmitting the plurality of optical test signals comprises transmitting signals at a plurality of different known polarisations for each one of the different bandwidths.

7. The method of claim 6, comprising depolarising the received optical test signals into a plurality of beams prior to measuring the power of each beam and determining the signal transfer characteristic of each beam.

8. The method of claim 1, further comprising generating the plurality of optical test signals.

9. The method of claim 8, wherein the step of generating the plurality of optical test signals comprises generating optical white noise, filtering the noise to provide the required bandwidth for the optical test signal and attenuating the noise to provide a required power for the optical test signal.

10. The method of claim 9, further comprising generating the plurality of optical test signals, wherein the step of generating the optical test signals comprises generating optical test signals of the same bandwidth at different polarisations.

11. The method of claim 1, comprising transmitting no optical test signal along the light path and measuring the power of any received signal to determine the light path noise level and using the determined light path noise level when determining the signal transfer characteristic along the light path.

12. An optical network comprising a light path extending between a first point and a second point, at least one optical element provided in the light path, the optical network comprising a testing mechanism for determining a signal transfer characteristic along the light path, the testing mechanism comprising a transmitter arranged to transmit a plurality of optical test signals of different bandwidths from the first point along the optical path, wherein each optical test signal has a substantially rectangular spectrum of power, a known bandwidth and a known power, a receiver arranged to receive the optical test signals at the second point after they have travelled along the light path, a measurement device arranged to measure the power of each received optical test signal and a processor arranged to determine the signal transfer characteristic along the light path from the power measurements and the known bandwidths.

13. The optical network of claim 12, wherein the receiver comprises a broadband photodiode and the measurement device comprises a power meter.

14. The optical network of claim 12, wherein the network comprises a spare transponder at the second point and the transponder comprises the receiver and the measurement device.

15. The optical network of claim 12, comprising a generator arranged to generate the plurality of optical test signals.

16. The optical network of claim 15, wherein the generator comprises a white noise generator arranged to generate optical white noise, an optical filter arranged to filter the noise to provide the required bandwidth for the optical test signal and an optical attenuator arranged to attenuate the noise to provide a required power for the optical test signal.

17. The optical network of claim 16, wherein the generator comprises a polariser arranged to polarise the optical test signal to provide a known polarisation.

18. The optical network of claim 17, comprising a polarisation beam splitter arranged to depolarise the optical test signal prior to measurement.

19. The optical network of claim 12, wherein the or each optical element comprises any one or more or a combination of an optical multiplexer, an optical demultiplexer, an optical interleaver, an optical deinterleaver, an optical wavelength selective switch or similar optical element.

20. A test apparatus comprising:
a test element for an optical network for determining a signal transfer characteristic along a light path between a first point and a second point in the optical network, at least one optical element being located in the light path, the test element comprising a transmitter interface mechanism arranged to interface with the first point in the network, the test element comprising a transmitter arranged to transmit a plurality of optical test signals of different bandwidths from the first point along the optical path, and a controller arranged to control the bandwidths of the optical test signals, wherein each of the optical test signals has a substantially rectangular spectrum of power, a known bandwidth, and a known power; and a test device for the optical network for determining the signal transfer characteristic along the light path between the first point and the second point in the optical network, the test device comprising a receiver interface mechanism arranged to interface with the second point in the network, the test device comprising a receiver arranged to receive a plurality of optical test signals after they have travelled along the light path;

a measurement device arranged to communicate with the receiver and measure the power of each received optical test signal; and a processor arranged to determine the signal transfer characteristic along the light path from the power measurements and the known bandwidths.

* * * * *